Nov. 23, 1965     C. J. STALEGO     3,219,425
METHOD AND APPARATUS FOR FORMING GLASS FIBERS
Original Filed Feb. 25, 1955     4 Sheets-Sheet 4
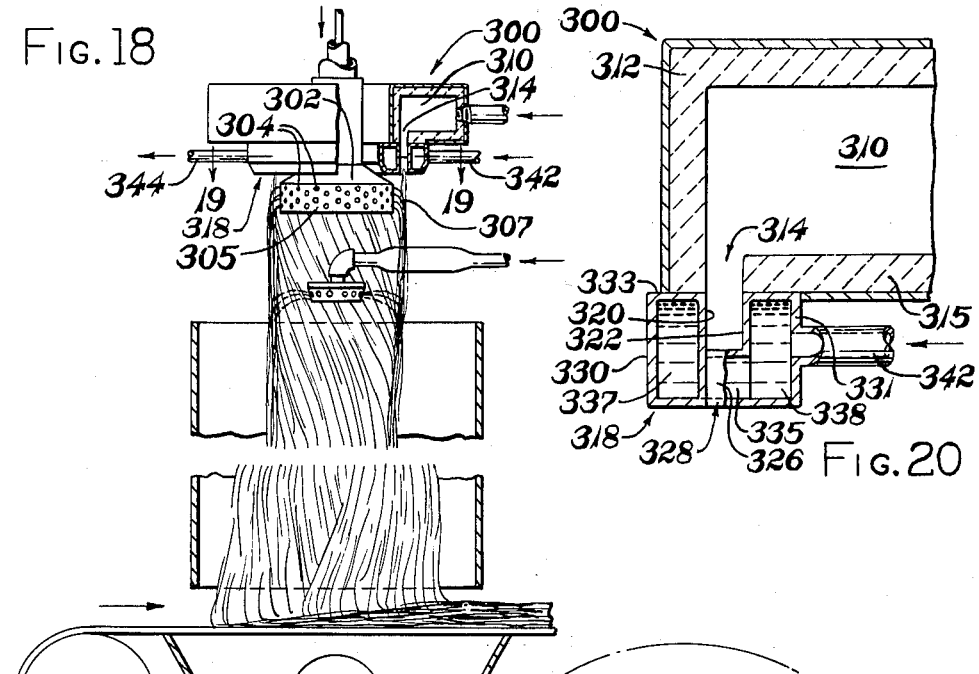
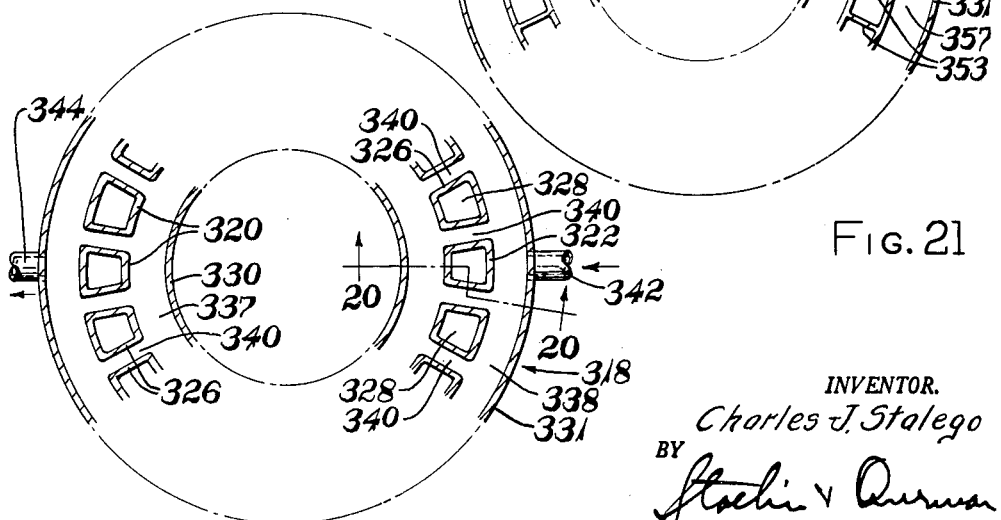
INVENTOR.
Charles J. Stalego
BY
ATTYS.

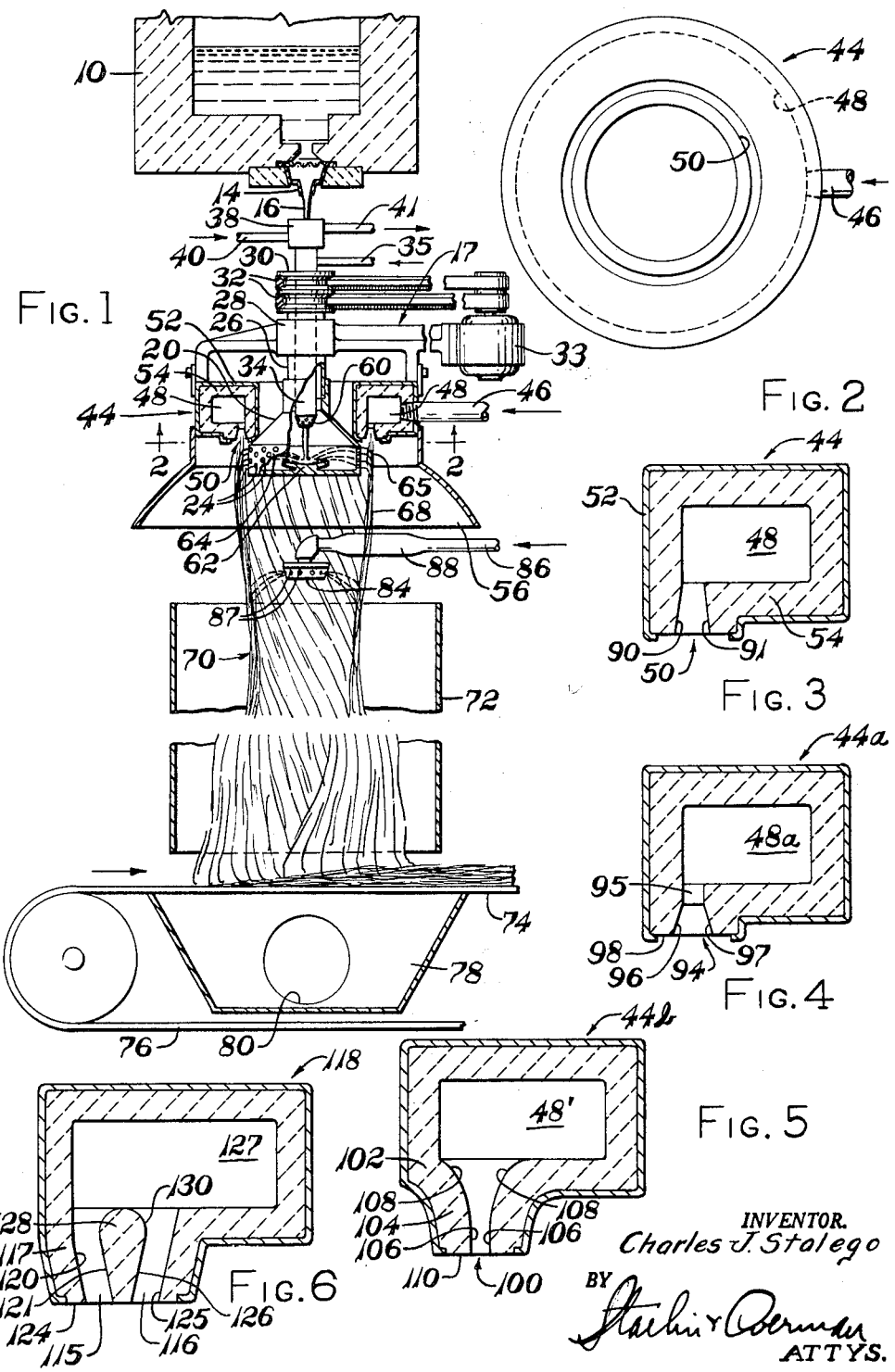

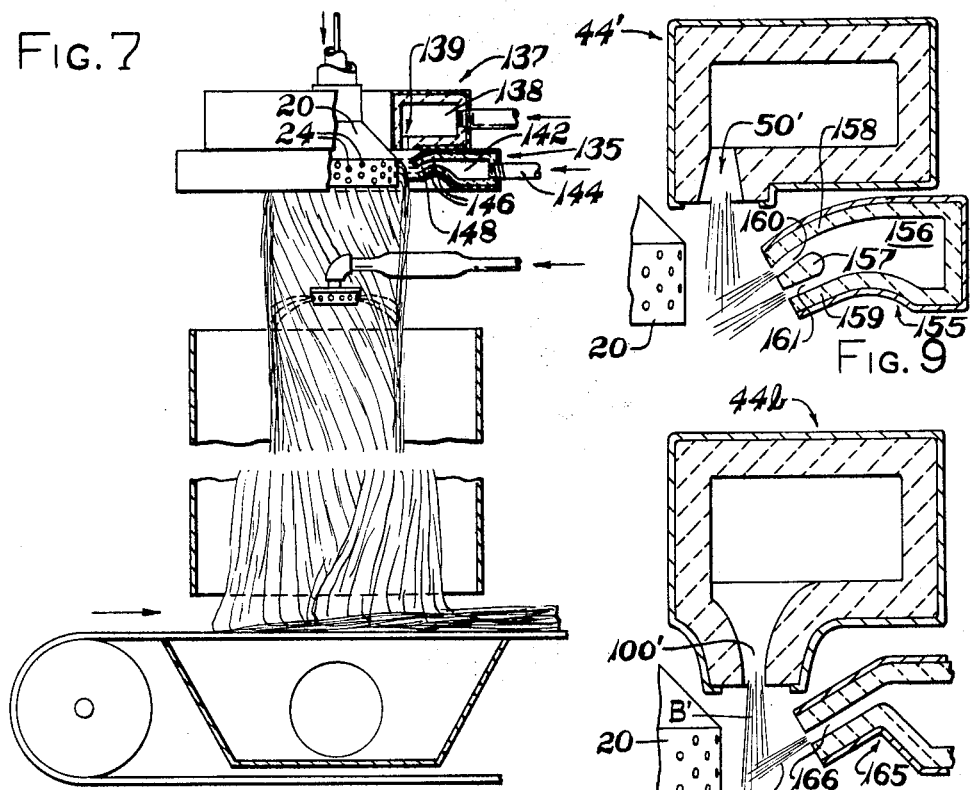

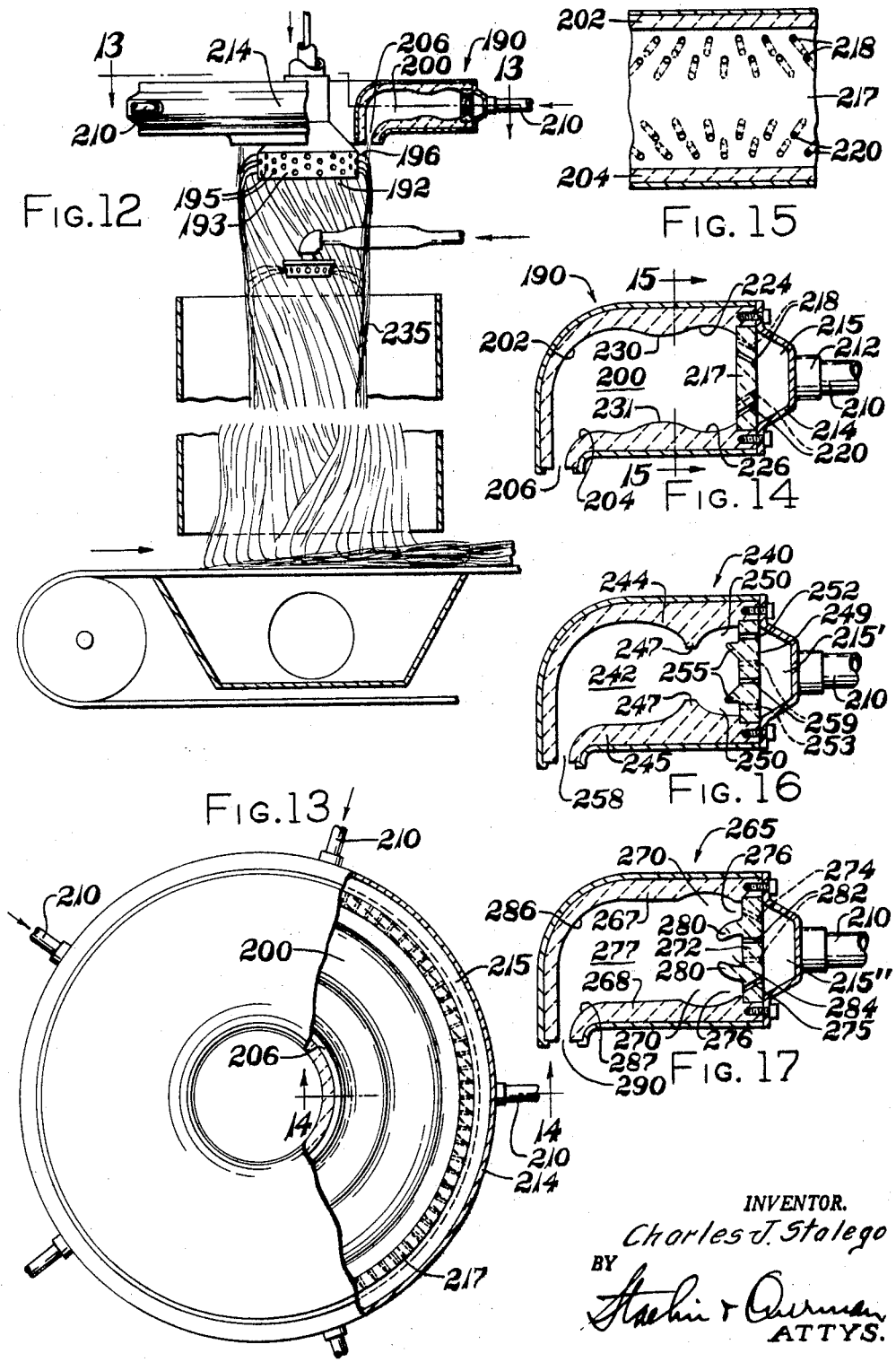

United States Patent Office 3,219,425
Patented Nov. 23, 1965

3,219,425
METHOD AND APPARATUS FOR FORMING
GLASS FIBERS
Charles J. Stalego, Newark, Ohio, assignor to Owens-Corning Fiberglas Corporation, a corporation of Delaware
Original application Feb. 25, 1955, Ser. No. 490,458, now Patent No. 3,012,281, dated Dec. 12, 1961. Divided and this application Mar. 23, 1961, Ser. No. 97,863
8 Claims. (Cl. 65—6)

This application is a division of my copending application Serial No. 490,458, filed Feb. 25, 1955, issued into Patent 3,012,281.

This invention relates to method and apparatus for forming fibers and more especially to a method and arrangement for forming fibers from heat-softenable, fiber-forming material through the application of centrifugal forces and high velocity gaseous blasts to the softened material.

The invention embraces a method of forming primary fibers from heat-softened material such as glass by delivering a viscous body or streams of heat-softened mineral material such as glass, slag or fusible rock to a zone, applying centrifugal forces at the zone to form primary filaments or thin elongated bodies of the material and delivering the primary filaments or elongated bodies into a blast or blasts for attenuating the filaments or bodies to find fibers of varying lengths.

An object of the invention is the provision of a method involving the application of centrifugal forces and an attenuating blast or blasts to heat-softenable material wherein viscous heat-softened material such as glass is delivered to a rapidly rotating surface causing the glass to move in generally radial directions under the influence of centrifugal forces from the rotating surface in the form of elongated bodies or primary filaments, burning a combustible mixture in a confined zone and projecting the product of combustion through a restricted orifice or orifices as intensely hot blasts into engagement with the elongated bodies or primary filaments for attenuating the material to fibers, the restricted orifice construction being configurated, shaped or patterned to obtain a blast or blasts of exceedingly high velocity with a minimum of turbulence whereby attenuation of the elongated bodies to fibers is greatly improved and the thermal efficiency is increased over prior methods.

Another object of the invention is the provision of an internal-combustion burner having one or more gas discharge passages or orifices arranged to provide a generally annularly shaped blast and wherein the passages or orifices are bounded by curved or angularly arranged walls defining an area of varying cross-sectional configuration whereby the burned gases move at very high velocities through the passages or orifices Another object of the invention is the provision of an internal-combustion burner having gas passages or orifices formed to discharge the gases of combustion through two generally concentrically disposed, restricted annular zones, the walls defining the zones being arranged to direct the gas streams moving through the annular zones into convergent relation, combining them to form a single annularly shaped blast having a depth greater than the depth of the gas in either stream and of extremely high velocity.

Another object of the invention involves the application generally opposing the path of travel of the primary blast to elongated bodies of fiber-forming material formed by centrifugal forces to attenuate the elongated bodies to fibers, the method including one or more supplemental gaseous blasts formed of burned gases or products of combustion correlated with the primary blast to avoid projection of the bodies entirely through the primary blast and thus assure proper attenuation of all of the elongated bodies to fibers.

Another object of the invention resides in a method of burning a combustible mixture in an annular, confined zone at extremely high temperatures and introducing combustible mixture into the annular, confined zone in a manner to direct the incoming gases into impinging relation with the interior walls of the annular zone to obtain substantially complete combustion of the mixture in the confined zone and projecting the intensely hot burned gases or products of combustion from the annular zone as an annularly shaped, high velocity blast into engagement with viscous bodies of fiber-forming material projected by centrifugal forces into the high velocity blast whereby the bodies are attenuated to fine fibers.

Another object of the invention is the provision of a method of forming high velocity attenuating blasts and particularly a plurality of blasts arranged in an annular pattern produced by burning a combustible mixture in an annularly shaped, internal-combustion chamber and projecting the intensely hot products of combustion through a plurality of orifices or outlets to provide attenuating forces operative in an annularly shaped zone for attenuating heat-softened material, such as glass, to fibers.

Another object of the invention resides in an apparatus including means for forming and directing a substantially annularly shaped blast of intensely hot gases into contact with enougated bodies or primary filaments of fiber-forming material projected into the blast under the influence of centrifugal forces for attenuating the material to fine fibers and directing a secondary blast or blasts from a supplemental burner or burners in a direction generally opposing the path of travel of the primary filaments or bodies in order to prevent traverse of the filaments or bodies through the high velocity blast and assist in bending the primary filaments or bodies in the direction of travel of the gases of the annularly shaped blast to attain a high efficiency of attenuation and increase the production of fine fibers.

A further object of the invention is the provision of a means for producing a plurality of intensely hot, high velocity gas streams or blasts arranged in an annular pattern or zone wherein the temperatures of the walls defining the individual streams or blasts are controlled and maintained within a safe operating range through the use of a cooling or temperature-reducing medium or fluid circulated adjacent to and in contact with the walls.

Further objects and advantages are within the scope of this invention such as relate to the arrangement, operation and function of the related elements of the structure, to various details of construction and to combination of parts, elements per se and to economies of manufacture and numerous other featuers as will be apparent from a consideration of the specification and drawing of a form of the invention, which may be preferred, in which:

FIGURE 1 is an elevational view of one form of apparatus for carrying out the method of the invention, certain parts being shown in section for purposes of illustration;

FIGURE 2 is a sectional view taken substantially on the line 2—2 of FIGURE 1;

FIGURE 3 is an enlarged, fragmentary sectional view of a portion of the annular blast-producing burner of FIGURE 1 showing a form of restricted gas discharge passage or orifice construction;

FIGURE 4 is a view similar to FIGURE 3 illustrating a modified form of gas discharge passage for the burner;

FIGURE 5 is a view similar to FIGURE 3 showing another form of gas discharge passage or orifice for a burner;

FIGURE 6 illustrates an annular burner provided with a plurality of gas discharge passages for producing a composite blast;

FIGURE 7 is an elevational view, partly in section, illustrating a fiber-forming apparatus embodying means for producing main and supplemental blasts for forming fibers from centrifuged bodies of fiber-forming material;

FIGURE 8 is an enlarged fragmentary view of a portion of the construction illustrated in FIGURE 7 showing the relation of the main and supplemental burners and gas discharge passages;

FIGURE 9 illustrates the main blast-producing burner and supplemental or antipenetration blast burner embodying modified forms of gas discharge passages or orifices;

FIGURE 10 is a view similar to FIGURE 9 showing modified forms of gas discharge passage or orifice constructions for the main blast and supplemental blast burners;

FIGURE 11 is a view similar to FIGURE 10 showing another arrangement of gas passage or orifice construction for the main blast and supplemental or antipenetration blast burners;

FIGURE 12 is an elevational view, certain parts being shown in section, illustrating a modified burner construction for producing a blast utilized in the method of forming fibers;

FIGURE 13 is a horizontal sectional view taken substantially on the line 13—13 of FIGURE 12;

FIGURE 14 is an enlarged sectional view taken substantially on the line 14—14 of FIGURE 13;

FIGURE 15 is a sectional view through a portion of the burner, the section being taken on the line 15—15 of FIGURE 14;

FIGURE 16 is a fragmentary sectional view showing another form of burner construction;

FIGURE 17 is a sectional view similar to FIGURE 16 showing a further modification of burner construction;

FIGURE 18 is a view similar to FIGURE 12 illustrating a burner embodying a plurality of restricted orifices or passages arranged in an annular pattern for discharging gases from the burner in the form of high velocity blasts;

FIGURE 19 is a horizontal sectional view taken substantially on the line 19—19 of FIGURE 18;

FIGURE 20 is an enlarged sectional view through the burner orifice construction, the same being taken substantially on the line 20—20 of FIGURE 19, and FIGURE 21 is a view similar to FIGURE 19 showing a modified form of multiple gas passage or orifice construction for the burner.

The apparatus in which the invention is embodied is inclusive of a means for supplying molten glass or other heat-softenable material to a distribution zone, the latter including a rotor or spinner adapted for receiving the stream of molten material and projecting or discharging primary filaments or elongated bodies of glass or other fiber-forming material from its periphery under the influence of centrifugal forces, and an arrangement for applying gaseous blasts as attenuating forces to the primaries or bodies for forming the same into comparatively long fine fibers of varying lengths. The elongated bodies or primary filaments are quite viscous as they enter the blast.

Several forms of internal-combustion burner and gas passage or orifice constructions are shown in the drawings wherein primaries or elongated bodies of fiber-forming material are subjected to the heat of one or more streams or blasts of intensely hot gases to raise the temperature of the bodies to attenuating temperature, the intensely hot, high velocity blast or blasts of burned gases engaging the primaries or bodies of fiber-forming material in a manner to change or modify the direction of travel of the primaries or bodies in drawing or attenuating the same to fine fibers of one-half micron or more in diameter.

FIGURE 1 is illustrative of an apparatus embodying one form of the invention in carrying out the method of forming fibers through the utilization of centrifugal forces and intensely hot, high velocity gaseous blasts. In FIGURE 1 there is illustrated a forehearth or receptacle 10 of a melting furnace containing a supply of molten fiber-forming material such as glass. The forehearth 10 is equipped with a feeder or bushing 14 for delivering or discharging a stream 16 of molten glass or other fiber-forming material in flowable condition.

The centrifugal means for forming primaries or elongated bodies from the stream 16 is disposed beneath the feeder 14 and is supported upon a frame 17. The centrifugal apparatus is inclusive of a spinner or rotor 20 having a peripheral zone provided with a plurality of small openings 24. The spinner 20 is mounted on or carried by a shaft 26 journaled in bearings contained within a suitable housing 28. The shaft 26 is provided with pulleys or sheaves 30 driven by belts 32 from a suitable power means, for example, an electric motor 33.

Disposed within the hollow shaft 26 is a tubularly shaped burner 34 provided with an inlet 35 for the introduction of a fuel-and-air mixture into the burner 34. The burner is formed with a hollow central zone to accommodate the delivery of the stream 16 of glass into the interior of the spinner or rotor 20. The burner is provided with a water-cooled jacket 38 having an inlet duct 40 and an outlet duct 41 for conveying water from a supply through the jacket 38 and away from the jacket.

Disposed adjacent and surrounding a portion of the spinner 20 is a means for burning a combustible mixture in a confined zone and discharging the intensely hot burned gases or products of combustion as a high velocity attenuating blast. The means illustrated in FIGURE 1 is in the form of an annularly shaped burner 44 which is connected with one or more pipes or ducts 46 for conveying a fuel-and-air mixture into a confined zone or combustion chamber 48 which is of annular shape.

If desired, the confined zone or combusion chamber 48 may be formed of several sections or compartments defined by radially arranged partitions, each compartment or section being supplied with fuel-and-air mixture through individual ducts similar to the duct 46. In order to prevent ignition of the mixture in the duct 46, a fire screen such as a perforated wall (not shown) is disposed at the entrance of the mixture into the combustion zone 48.

The fuel-and-air mixture is substantially completely burned within the confined zone or chamber 48, the lower wall of which is provided with a restricted gas discharge passage, orifice or outlet 50. The annular burner 44 is enclosed within a metal jacket or casing 52, the combustion chamber 48 being bounded by refractory walls 54 disposed within the metal casing 52. In the embodiment shown in FIGURE 1, the gas discharge outlet 50 is of annular shape or character which provides an anularly shaped, downwardly directed blast adjacent the periphery of the spinner or rotor 20. A metal jacket or hood 56 is secured to the burner 44 which serves to control or restrict induced air flow caused by rapid travel of the gases of the blast.

The burner 34 is of multiple-walled construction having a hollow central zone to admit the flow of the stream 16 of glass and to form an elongated gas-conveying chamber surrounding the control zone. The fuel-and-air mixture, admitted to the burner 34 through the mixture inlet 35, is discharged into the spinner through a perforated end cap or construction 60. The gas-and-air mixture delivered to the burner 34 preferably burns exteriorly of the outlet formed by the perforated cap 60. The burner 34 serves as a preheating burner for elevating the temperature of the spinner 20 when initiating the operation of the fiber-forming devices and may also be utilized to increase or control the temperature of the glass or other fiber-forming material delivered into the spinner 20.

The stream 16 of glass from the feeder or bushing 14 flows into or is delivered through the hollow interior of the burner 34 and impinges upon a glass-distributing means or slinger plate 62. The slinger plate 62 and spinner 20 rotate as a unit at a speed upwards of 3000 r.p.m. or more. During rotation of the spinner and slinger plate, the molten glass falling onto the slinger plate 62 is moved outwardly of the axis of rotation of the spinner under the influence of centrifugal forces toward the band-like portion 64 defining the periphery of the spinner at its greatest diameter. The molten glass delivered outwardly by the slinger 62 flows over the extent of the band 64 and moves outwardly through the small-diameter openings 24 in the form of a plurality of elongated bodies, primaries, primary filaments or fibers 65 which are comparatively viscous but are of a temperature above the solidification temperature of the glass.

The bodies or primaries 65 move outwardly relative to the axis of rotation of the rotor 20 in directions determined by the resultant of the combined centrifugal and tangential forces and travel into the path of the blast of gases projected from the chamber 48 through the restricted orifice 50. The orifice is disposed so as to project the blast generally downwardly, concentric with and adjacent to the periphery of the spinner 20 and into engagement with the primaries 65. The heat of the blast renders the primaries less viscous or more plastic, and the velocity of the gases of the blast bends the primaries downwardly, attenuating them into fine fibers 68 formed in a generally cylindrical configuration.

The fibers are of varying lengths and may be upwards of 18″ or more in length. The cylindrical formation or pattern of the fibers is referred to as a beam of fibers 70. The shape and characteristics of the orifice 50 in the burner wall are hereinafter described in detail and the orifice 50 is fashioned to increase or augment the velocity of the gases forming the blast as compared with the gas velocities from conventional orifices.

The shield 56 serves to control induced air set up by the velocity of the blast to avoid impairment of the engagement of the blast with the bodies or primaries 65. The hollow beam of fibers 70 moves downwardly through a housing or enclosure 72, and the fibers thereof are collected in a mass or mat formation upon a suitable surface, for example, the upper flight 74 of an endless conveyor 76, the conveyor moving in a righthand direction as viewed in FIGURE 1. A suction box 78 is disposed beneath the flight 74 of the conveyor and is connected by means of a tube or duct 80 with a blower (not shown) or source of suction or reduced pressure effective in the receptacles or box 78 to facilitate collection and orientation of the fibers upon the collecting surface.

A binder or adhesive may be applied to the beam of fibers during the travel of the fibers to the collecting surface or may be applied to the fibers after they have been deposited upon the collecting surface. As illustrated in FIGURE 1 a binder applicator 84 is disposed within the beam of fibers and is supplied with binder or adhesive from a supply through a duct 86. As illustrated, the applicator is formed with a plurality of orifices 87 through which a liquid binder is discharged radially onto the fibers of the beam. At the zone wherein the duct 86 projects through the beam of fibers, the duct may be flattened to the configuration illustrated at 88. It is to be understood that if desired, powdered or comminuted binder may be delivered onto the fibers and later cured by conveying the mat of binder-coated fibers through a heated zone.

The passage or orifice 50 formed in a lower wall of the refractory 54 through which the burned gases from the chamber 48 of the burner 44 are discharged as a high velocity blast is shaped to a configuration to increase or augment the velocity of the gases projected from the burner as compared with conventional orifices. One form of orifice for accomplishing this result is shown in FIGURE 1 and in enlarged section in FIGURE 3. The orifice or gas passage 50 is formed, curved or arcuately shaped to conform generally to or be concentric with the peripheral contour of the spinner or rotor 20 whereby the arcuately shaped blast is directed in a path generally parallel with the axis of the rotor and in an annular zone adjacent the outer wall or band 64 of the rotor.

The annular side walls 90 and 91 forming the passage or orifice 50 are, in cross section, disposed in diverging relation as illustrated in FIGURE 3 to facilitate the flow of burned gases through the orifice with a minimum of frictional resistance so that a blast of exceedingly high velocity is obtained for attenuating engagement with the elongated bodies or primaries projected outwardly through the openings 24 in the peripheral band 64 of the rotor. The angular or divergent relation of the walls 90 and 91 defining the passage 50 provides a passage of varying cross-sectional area in a downward direction, providing a blast of gases traveling at high velocities.

FIGURE 4 is a view similar to FIGURE 3 illustrating another configuration of gas passage or orifice 94 in the wall of an annular burner 44a. In this form the orifice includes a narrow, band-like portion 95 of constant width and angularly disposed walls 96 and 97 which are arranged in divergent relation from the band portion 95 to the exterior surface 98 of the burner 44. The zone or band 95 of the passage provides a zone of greatest restriction and, in conjunction with the angularly disposed walls 96, provides an annular passage of generally Venturi shape in cross section which facilitates high-velocity flow of gases from the chamber 48a through the passage. Being of varying cross-sectional area, the passage 94 offers a minimum of frictional resistance to the flow of gases therethrough. In the forms of orifice construction illustrated in FIGURES 1, 3 and 4, the included angle between the diverging walls may be varied to secure desired velocity characteristics for the gases of the blast, and included angles up to 40° have been found to provide high gas velocities for fiber attenuation purposes.

Another form of annular orifice configuration is illustrated in cross section in FIGURE 5. In this form, the burner 44b, formed with a combustion chamber 48′, has a lower wall 102 of refractory provided with an orifice or passage 100. In this form, the wall 102 is formed with an annular depending portion 104. The annular passage 100 is formed within the depending portion 104, the passage being bounded or defined by vertically disposed, comparatively short-length walls 106 which are joined with arcuate or curved surfaces 108 forming a passage of varying cross-sectional area to facilitate rapid travel of gases through the passage.

In this form, the zone of greatest restriction defined by walls 106 is located adjacent the outlet of the passage at the lower surface 110 of the depending portion 104. Thus, the curved or arcuately shaped walls 108 form a generally divergently shaped passage through which the burned gases move at high velocities with a minimum of frictional resistance. In order to obtain extremely high velocities, it is desirable that the restricted zone defined by walls 106 be of relatively short length and should be of a length sufficient to maintain a proper width for the restricted zone to maintain control of the depth of the blast and direction of travel of the gases of the blast under prolonged operations.

FIGURE 6 is illustrative of another form of orifice or passage construction for delivering burned gases from a combustion burner to form an annular blast of high velocity. In this arrangement two passages 115 and 116 are formed in a depending portion 117 of the annular burner 118. The passages or orifices 115 and 116 are of generally curved or arcuate configuration to provide a curved or annular blast generally concentric with the periphery of the rotor 20 illustrated in FIGURE 1. Passage 115 is defined by walls 120 and 121 preferably convergently arranged toward the direction of the discharge outlet whereby the maximum restriction to the flow of gases is existent at the lower wall 124 of the combustion zone or chamber 127, providing maximum gas velocity at the exit of passage 115. The annular gas discharge passage 116 is defined or bounded laterally by walls 125 and 126. The walls 121 and 126 are formed by opposite sides of a member 128 formed of refractory. The upper surface zone 130 of the partition or member 128 is of curved configuration, the curvature thereof blending with the walls 121 and 126. It should be noted that passages 115 and 116 are angularly disposed in a generally convergent relation whereby the burned gases or products of combustion from the chamber 127 projected through these passages are joined at a zone immediately beneath wall surface 124 of the burner to form a composite blast of intensely hot burned gases, the zone of juncture of the gas streams from passages 115 and 116 occurring at the zone where the primaries or elongated bodies are projected by the rotor or spinner into the blast.

The composite blast thus formed by gases delivered through passages 115 and 116 may be termed a resultant force blast which is of exceedingly high velocity and of substantial horizontal depth at the juncture of the concentric gas streams from passages 115 and 116. The partition 128 is supported at circumferentially spaced zones by means of bridges or sections (not shown) joining the partition with the walls 120 and 125 of the passages.

FIGURE 7 is illustrative of fiber-forming apparatus of the general character shown in FIGURE 1 incorporating a supplementary or auxiliary burner 135. The blast from the supplemental burner supplies additional heat at the zone of blast attenuation of the bodies or primaries into fine fibers and is directed toward the outwardly moving primaries or bodies of glass to prevent the projection or penetration of the primaries or bodies through the main or attenuating blast.

As shown in FIGURES 7 and 8, the burner 137 providing the attenuating blast is of the same character as the burner 44 shown in FIGURE 1 and is adapted to burn combustible mixture in the chamber or confined zone 138, the burned gases being projected through an orifice 139 as an intensely hot, high velocity blast B directed into engagement with elongated bodies or primaries 65 of the fiber-forming material discharged through small openings 24 in the spinner 20. The annular orifice or gas passage 139 may be defined laterally by vertically disposed walls 140 or may be configured or shaped as shown in other figures of the drawings.

The supplementary or auxiliary burner 135 disposed beneath the burner 137 is formed with a combustion chamber 142 and is equipped with one or more fuel-and-air mixture inlets 144. The burner 135 is generally annular, and the burner walls have convergent portions 146 providing a passage or orifice 148 through which burned gases from the combustion chamber 142 are projected generally toward the glass primaries or bodies 65. The exit zone of the passage 148 may be formed with flared walls providing a stream or blast C of gases of a width to engage and interrupt the horizontal traverse of any primaries or bodies 65 which may penetrate through the main blast from the passage 139.

Thus, the blast or stream of hot gases projected from the auxiliary burner 135 provides an antipenetration medium to assure that all of the primaries or elongated bodies delivered into the main blast from burner 137 will be attenuated to fibers. Should any of the primaries or elongated bodies project through the main blast, they will be intercepted by the supplemental blast from the burner 135 and redirected thereby into the path of travel of the gases of the main blast and attenuated to fine fibers.

The burned gases projected from the supplemental burner 135 preferably move or travel at a substantially lesser velocity than the gases of the attenuating blast from the burner 137. The supplemental blast functions as a medium to prevent penetration through the main blast of the centrifuged primaries and supplies heat to the primaries, augmenting the heat of the gases of the main blast to foster improved attenuation of all of the primaries to fine fibers. Fibers formed by this method usually are longer and finer as the added heat from the antipenetration burner 135 maintains the fiber-forming material in a softened or attenuable state for a greater distance of travel in the attenuating blast.

The antipenetration means may be utilized with various forms or shapes of attenuating blast orifice construction, and the orifice or gas passage of the antipenetration burner may be shaped to various configurations. FIGURE 9 is illustrative of a supplemental or antipenetration burner 155 formed with annular, dual gas passages adapted to produce a resultant force blast in conjunction with a main burner provided with divergent-walled gas passage or orifice. The burner 44' for producing the attenuating blast is the same as that illustrated in FIGURE 3 and is formed with a gas discharge passage 50' through which burned gases are discharged at high velocities.

The antipenetration or supplemental burner 155 is disposed beneath or adjacent the main burner 44' and is formed with an orifice or gas passage means similar to that shown in FIGURE 6. The orifice construction of the supplemental burner in FIGURE 9 includes a partition 157 disposed between walls 158 and 159 of the throat portion of the burner.

The inner surfaces of wall portions 158 and 159 and the adjacent exterior surfaces of the partition 157 define the gas passages or orifices 160 and 161 through which burned gases from the burner chamber 156 are discharged in dual streams. The pairs of walls defining the passages 160 and 161 preferably are arranged in converging relation so that the gases passing through each of the passages are combined or joined substantially at the zone of engagement with the attenuating blast from the orifice 50' at the region of the entrance of the primary fibers or bodies into the main or attenuating blast.

The gas streams from the passages 160 and 161 of the supplementary burner are diverted or directed slightly downwardly, and the gases from the supplementary burner effectively join those of the main blast from the passage 50' to form a downwardly directed, composite blast of annular shape. Joining the gas streams from the burners provides a resultant force blast of increased heat and of a resultant high velocity which provides for improved attenuation as the length of the effective heating zone at the attenuating region is increased so that attenuation endures or is carried on through a greater distance, and the fibers formed are, on the average, longer and finer than those produced from a single blast.

It is to be understood that the orifice or gas passage of the main burner 44' and the gas passage of the supplemental burner 155 are preferably of a curvature concentric with the periphery of the rotor or spinner and provide substantially annular blasts of intensely hot gases, the blast from the supplemental burner 155 being directed generally radially toward the axis of rotation of the rotor in the region of the primaries to prevent the projection or penetration of primary fibers or bodies through the main blast. If any primaries or bodies are projected through the main attenuating blast, the blast or gas stream from the supplemental burner, moving in opposition to the direction traveled by the primaries, redirects such primaries generally downwardly into the main attenuating blast. By this method, all of the fiber-forming material distributed by the spinner or rotor 20 is formed into usable fibers.

FIGURE 10 illustrates a supplementary burner 165 having another form of annular gas discharge passage or orifice 166, the burner 165 being shown in combination with a main burner 44b having an orifice or passage 100' of the character shown in FIGURE 5 for producing the main attenuating blast B'. In the form of orifice or passage 166 of the supplemental burner 165, the walls of the passage in cross-section are substantially parallel to provide a ribbon-like blast C' of annular shape in which the gases are directed generally toward the outwardly moving primaries and slightly downwardly of the gases of the attenuating blast from the main burner orifice 100'. The antipenetration blast C' from the passage or orifice 166 is located in the region of the primary fibers or bodies projected by centrifugal force into the main blast and serves to direct downwardly any primaries or bodies which may penetrate through the gases of the main blast from the burner 44b. The heat of the gases of the blast C' augments that of the attenuating blast B' to increase the effective attenuating range of the attenuating blast.

FIGURE 11 illustrates in cross section another form of annular main and supplemental burners wherein the main burner 118 and its gas discharge means are of the character shown in FIGURE 6. An annular depending portion of the burner 118 is formed with convergently arranged gas passages 115 and 116 defined by a partition or wall 123. The blast B'' formed by the joining of the high velocity gas streams moving though passages 115 and 116 provides a high velocity attenuating means or medium for forming fine fibers from the primaries projected into the blast from the openings in the rotor or spinner 20.

Disposed beneath the burner 118 is an annualr burner 175 formed with a combustion chamber 176 and a gas discharge passage 178 defined by convergently arranged, curved walls 179 and 180. The burner chamber 176 is preferably of lesser volume that the combustion chamber of the main burner 118, and the blast or stream C'' of burned gases projected through the passage 178 of the supplemental burner 175 is of less velocity than the fiber-attenuating blast formed by burned gases discharged from the main burner 118.

The blast or stream of burned gases from the passage 178 is directed toward the spinner or rotor so that any primaries that may penetrate through the main or attenuating blast will be intercepted by the supplemental blast C'' and redirected into the zone of the main blast B'' and attenuated to fibers. The blast C'' from the supplementary burner 175 is inclined slightly downwardly so that the gases of blast C'' join those of the main attenuating blast and thereby establish a downwardly extending heating zone of substantial length so that the fibers being drawn or attenuated are maintained in an intensely hot attenuating zone for a substantial distance, a condition which fosters the formation or attenuation of longer and finer fibers from the primaries.

The main blast B'' from the burner 118 is of high velocity due to the juncture or bending of the gas streams from passages 115 and 116 into a composite blast, the velocity of which is equal to or exceeds the velocity of the gases in the individual passages 115 and 116. Through the use of the intensely hot blast of this character emanating from the burner 118 in conjunction with the hot gases from the supplemental or antipenetration burner 175, substantially more material may be attenuated to fine fibers per unit of time than is possible with a blast from a conventional orifice, an arrangement which facilitates economical production of fine fibers.

FIGURES 12 and 13 illustrate a fiber-forming apparatus utilizing an annular burner 190 of modified construction for producing a high velocity blast particularly usable for attenuating glass primaries to fine fibers. The annularly shaped burner 190 surrounds the upper portion of the rotor 192 which is similar to the rotor 20. The rotor 192 has a peripheral band portion 193 provided with openings 195 through which primaries 196 of heat-softened material are projected outwardly by centrifugal forces in the manner described in connection with the apparatus shown in FIGURE 1.

The burner 190, illustrated in section in FIGURES 14 and 15, is formed with an annularly shaped combustion chamber or confined zone 200, the walls 202 and 204 being lined with refractory as shown particularly in FIGURE 14. Portions of the walls 202 and 204 are convergently arranged to form a restricted passage or orifice 206 through which burned gases or products of combustion from chamber 200 are projected downwardly as a high velocity blast into engagement with the primaries 196.

In this form of burner construction, it is desirable that the fuel-and-air mixture be introduced into the combustion chamber through openings or channels disposed in a peripheral wall thereof in order to obtain proper distribution of the mixture in the annular combustion chamber 200, the openings or channels being arranged to convey or direct the incoming mixture into impinging relation with the heated walls of the combustion chamber. As shown in FIGURE 13, a plurality of ducts or pipes 210, preferably spaced at equal intervals peripherally of the burner 190, admit fuel-and-air mixture from a supply to a manifold 215 surrounding the combustion chamber 200.

Each of the pipes 210 is threaded into a boss portion 212 formed on a member 214, the latter forming the annular manifold chamber 215 into which the fuel-and-air mixture is delivered. Disposed between the manifold chamber 215 and the combustion chamber 200 is a wall or partition 217 provided with two series or groups of openings or channels 218 and 220 arranged respectively in the upper and lower zones of the wall 217, the openings or channels being of comparatively small size to avoid ignition in the manifold and arranged to convey combustible mixture from the manifold 215 into the combustion chamber 200.

The openings 218 and 220 are divergently or angularly arranged with respect to a horizontal plane through the central zone of the chamber 200 as shown in FIGURES 14 and 15. The mixture moving through openings 218 is impinged upon the recessed or concave wall section 224 of the burner and the openings or channels 220, being slanted downwardly, convey the combustible mixture into impinging engagement with the concave section 226 formed on the lower refractory wall 204 of the burner. The interior walls of the combustion chamber may be formed with raised or convex portions 230 and 231 which are joined with the curved portions 224 and 226 in the manner shown in FIGURE 14 in order to establish a turbulent action or movement of the burning gases in the chamber 200 in order to secure more complete burning of the mixture within the confined zone or chamber 200, a condition which accelerates the velocity of the gaseous attenuating blast directed onto the primaries 196. The manifold 215 may be of annular configuration extending around the annular burner construction 190 or it may be subdivided into sections with a section connected with each of the mixture inlet ducts 210. During operation of the burner 190, the interior walls of the refractory defining the combustion chamber 200 are heated by the burning gases to incandescence at temperatures upwards of 3000° F. or more.

The incoming fuel-and-air mixture, entering the chamber 200 from the manifold 215 through the angularly disposed passages 218 and 220, is impinged upon the intensely hot, incandescent walls of the burner. This contact of the mixture with the intensely hot wall surfaces 224 and 226 of the chamber results in instantaneous ignition of the mixture so that burning or combustion is initiated at the zone of entrance of the mixture into the chamber. The burning of the mixture continues during the traverse of the gases toward the orifice or gas passage 206 with a great expansion of the burning gases.

Due to the movement of the incoming fuel-and-air mixture in angular directions into the chamber 200, a condition of turbulence is set up in the gases moving through the chamber which aids or asists in the substantially complete burning of the mixture in the confined zone or chamber 200. The intensely hot burned gases are discharged through the restricted annular passage or orifice 206 as an intensely hot, high velocity blast particularly suitable for attenuating the primaries 196 to fine fibers. The beam of fibers 235 is delivered onto a collecting surface 74 in the same manner that the fibers are collected in the form of apparatus shown in FIGURE 1.

FIGURE 16 illustrates a cross-sectional view of an annularly shaped burner 240 showing another modification of blast-forming apparatus, the principle of operation of which is similar to that of the apparatus shown in FIGURES 12 through 15. The annular burner 240 is formed with an annular combustion chamber 242. The upper and lower refractory walls 244 and 245 are formed respectively with an annular ledge or ridge 247 extending into the combustion chamber 242 as shown in FIGURE 16. The ridge formations 247 and the rear wall 249 of the combustion chamber form annular pockets or auxiliary chambers 250.

The rear wall 249 of the burner is provided with a series of small openings or channels 252 and 253 for conveying fuel-and-air mixture from the manifold 215' into the burner, the mixture being conveyed to the manifold by pipes 210. The combustible mixture from the manifold 215' is projected under a pressure of from three to ten pounds into the pockets 250; and as the walls of the pockets are heated to very high temperatures of incandescence, the mixture is immediately ignited in the pockets 250 by reason of the impingement of the incoming mixture upon the intensely hot walls of the pockets.

As a further means of effecting rapid or instantaneous ignition of the mixture in the pockets 250, the front surface of the chamber wall 249 is preferably formed with projecting, annular abutments or ridges 255 which assist in directing the incoming mixture into impinging relation with the chamber walls in the regions of the pockets.

Due to the shape of the walls defining the combustion chamber 242 and pockets 250, the burning gases move in generally circuitous paths through the combustion zone with substantial turbulence toward the annular gas discharge passage or orifice 258. The circuitous paths traversed by the burning gases moving through the combustion chamber or confined zone 242 foster rapid flame propagation and complete burning of the mixture within the chamber. Hence, a large volume of mixture may be admitted into the combustion chamber without disturbing the stability of the blast of gases discharged from the burner.

If desired, additional fuel mixture may be delivered into the combustion chamber 242 through auxiliary passages 259 formed in the central zone of the chamber wall 249. The fuel-and-air mixture entering the chamber through the central passages 259 is immediately merged with the burning gases moving out of the pockets 250 and is ignited thereby.

The combustible mixture may be fed or delivered to the burner chamber at a comparatively high rate. As the gases are completely burned within the combustion chamber, they undergo great expansion and the intensely hot gases projected from the chamber travel through the restricted annular passage 258 at extremely high velocities, providing an efficient and effective blast for attenuating the primaries to fibers.

FIGURE 17 illustrates a modified form of burner 265 which is similar to the construction shown in FIGURE 16. In the annular burner 265, the upper and lower walls 267 and 268 formed of refractory are configurated with concave zones or recesses 270 adjacent a rear wall 272 of the burner. The wall 272 is provided at its upper and lower zones with annular rows of divergently or angularly openings or channels 274 and 275 in communication with a manifold 215'' which contains combustible mixture supplied to the manifold through ducts 210.

The angularly or divergently disposed channels 274 and 275 direct the fuel-and-air mixture into impinging engagement with the concave, recessed portion 270 of the combustion chamber 277. As the walls of the concave zones are heated to incandescence by continuous burning of the mixture in the chamber or confined zone 277, the incoming fuel-and-air mixture delivered into the chamber through the channels or openings 274 and 275, on contact with the hot walls of the concave zones, is immediately ignited. By this method, burning of the combustible mixture takes place throughout the entire region of the combustion chamber 277.

The forward surface of wall 272 is formed with annular projections or abutments 280 disposed above and below a horizontal plane through the central zone of the burner 265. The upper and lower surfaces of the annular abutments 280 cooperate with the concave surface portions of the combustion chamber wall to form annular pockets 276 adjacent the inlet zones of the inlet passages 274 and 275.

The provision of the pockets adjacent the mixture-inlet means or channels 274 and 275 facilitates rapid ignition of the mixture. Due to continuous combustion existent in the confined zone or combustion chamber 277, the walls are heated to incandescent condition; and as the fuel-and-air mixture is projected through channels 274 and 275 directly upon the intensely hot surfaces of the recesses 270, ignition is substantially instantaneous. The curved, cross-sectional contour of abutments 280 fosters a turbulence in the burning gases, enhancing flame propagation and accelerating combustion of the mixture within the confined zone or chamber 277.

The rapidity at which burning or combustion of the mixture takes place in chamber 277 makes possible the introduction of additional quantities of combustible mixture into the chamber. To carry out this purpose, the wall 272 between the manifold and the combustion chamber may be provided with passages or channels 282 to admit additional mixture from the manifold into an annular pocket or zone 284 existent between the inner walls of the annular abutments 280. The fuel-and-air mixture delivered into manifold 215'' is under comparatively low pressures of from three to ten pounds p.s.i. Portions 286 and 287 of the burner walls are curved to facilitate flow of the burned gases or products of combustion through a restricted discharge passage or orifice 290 as a high velocity blast of intensely hot gases at temperatures of 3000° F. or more. The curved wall 287 forms with the opposite portion of burner wall 267 a gas discharge passage of varying cross-sectional area in a downward direction or direction of flow of the gases of the blast.

FIGURE 18 illustrates a form of apparatus of the invention wherein a generally annularly shaped gas discharge zone of an annular burner 300 is partitioned or subdivided by radially disposed walls to form an annular blast made up of a plurality of individual, high velocity gas streams or blasts from the passages defined by the radially disposed walls. With particular reference to FIGURES 18 through 20, the burner 300, similar to burner 44, surrounds a rotor or spinner 302, the latter having openings 304 in the peripheral zone or band 305 through which primaries 307 are projected by rotation of the spinner 302. The burner 300 is formed with an annular combustion chamber 310 defined by refractory walls 312. The lower wall of the chamber 310 is formed with an annular passage 314.

Disposed beneath the refractory wall 315 of the burner 300 is a temperature-controlled gas discharge passage or orifice construction 318. The arrangement 318 is formed with inner and outer wall portions 320 and 322 joined together by circumferentially spaced, radially disposed partitions 326. The generally rectangular passages 328 formed by the walls 320, 322 and partitions 326 are in communication with the passage 314 through which gases from the chamber 310 are projected downwardly at high velocity to establish a generally annular blast directed downwardly past the peripheral band of the rotor 302 and into attenuating engagement with the primaries 307.

The gas passage construction 318 is formed with concentrically arranged walls 330 and 331, an upper wall 333 and a bottom wall 335. The walls 330 and 331 form with the wall portions 320 and 322 annularly shaped zones, channels or chambers 337 and 338. These channels, zones or chambers are adapted to accommodate a cooling fluid or temperature-controlling medium to maintain the walls defining the blast orifices or passages 328 at a safe operating temperature. Such control may be utilized to regulate the temperature of the blasts to a limited extent in the event that such control is desired. The radially disposed partitions or walls 326 of adjacent orifices or passageways 328 are spaced to provide connecting channels or passages 340 establishing communication between the chambers or zones 337 and 338. The cooling water or other temperature-controlling medium may be introduced into the outer chamber 338 through an inlet pipe or duct 342. The cooling water in chamber 338 may circulate freely around the walls defining the individual gas passages 328 by way of the connecting passages 340 and the innermost, annular coolant chamber 337. The cooling water or medium may be conducted away from the orifice construction 318 through an outlet pipe 344. The construction defining the restricted gas passages 328, cooled by a circulating medium as shown in FIGURES 18 through 20, enables the use of a metal-walled construction for guiding the intensely hot, high velocity burned gases into attenuating engagement with the primaries 307.

FIGURE 21 is a horizontal, sectional view of a blast orifice construction similar to FIGURE 19. In the arrangement shown in FIGURE 21, the water-cooled orifice or gas passage construction is inclusive of inner and outer walls 330 and 331. The individual blast-defining passages or orifices are spaced from the walls 330 and 331 and include concentric wall portions 350 and 351. Disposed between the walls 350 and 351 and spaced circumferentially are radially disposed walls or partitions 353. The radial walls 353 and the concentric wall portions 350 and 351 form passages 255 through which burned gases or products of combustion from a burner chamber 310 of the character shown in FIGURE 20 are discharged to form individual, high velocity blasts arranged in an annular pattern.

The arrangement shown in FIGURE 21 is cooled and the temperature is controlled by a circulating, cooling medium such as water. The walls 330 and wall sections 350 define a generally annular chamber or passage 356, and the walls 331 and wall sections 351 define a generally annular chamber 357. Inlet and outlet ducts, designated respectively 360 and 361, convey water or other cooling medium into and away from the chamber 357. Inlet and outlet pipes 364 and 365 convey water or cooling medium into and away from the chamber 256. The circulation of water around the walls 350 and 351 reduces or controls the temperature of these walls and the partitions 353 defining the individual gas passages 355.

It is apparent that, within the scope of the invention, modifications and different arrangements may be made other than is herein disclosed, and the present disclosure is illustrative merely, the invention comprehending all variations thereof.

I claim:

1. Apparatus for producing fibers from molten mineral material including a support, a member journaled for rotation on the support, means for rotating the member, means for delivering a stream of the material onto the rotating member whereby centrifugal forces of rotation project the material outwardly, said member being formed to shape the outwardly moving material into a plurality of elongated bodies, a burner having an annularly shaped combusion chamber, an annular manifold surrounding the combustion chamber for supplying combustible mixture to the combustion chamber, the outer peripheral wall of said combustion chamber having a plurality of channels formed therein, said channels being arranged in diverging directions to convey the combustible mixture into the chamber in generally radial directions toward the axis of the rotatable member to impinge the mixture into engagement with the heated surfaces throughout the periphery of the chamber adjacent the region of entry of the mixture into the chamber, the walls of the chamber being shaped to provide an annular restricted region concentric with and spaced from the peripheral wall to influence the gases in the chamber to move in circuitous paths during combustion to promote combustion of the gases and a restricted annular orifice formed in a lower wall of the chamber through which the intensely hot products of combustion are discharged downwardly as a high velocity blast into engagement with the bodies to attenuate the bodies to fine fibers.

2. Apparatus for producing fibers from molten mineral material including a support, a member journaled for rotation on the support, means for rotating the member, means for delivering a stream of the material onto the rotating member whereby centrifugal forces of rotation project the material outwardly of the axis of rotation, said member being formed to shape the outwardly moving material into a plurality of primary filaments, an annularly-shaped burner provided with an annular combustion chamber, an annular manifold surrounding the combustion chamber wherein the inner wall of the manifold forms the outer wall of the combustion chamber, said wall having a plurality of circumferentially-spaced passages to admit combustible mixture from the manifold into the combustion chamber, the mixture adapted to be burned in the combustion chamber, the upper and lower walls of the annular combustion chamber being curved to provide an annular restriction spaced from the outer wall of the combustion chamber to influence the gases in the chamber to move in circuitous paths to promote complete combustion of the gases, annular orifice means in a lower wall of the burner for discharging the intensely hot products of combustion as a high velocity blast moving in an annular path concentric with the periphery of the rotatable member and engaging the primary filaments in directions normal to the outward paths of travel of the filaments, a second burner of generally annular shape having a restricted annular orifice through which products of combustion from the second burner are discharged, the products of combustion from the second burner being directed toward the axis of rotation of the member and engaging the gases of the blast from the first-mentioned burner at the region of the engagement thereof with the primary filaments, and means for restricting the induced air set up by the blast from the first-mentioned burner.

3. An apparatus for producing fibers from heat-softened mineral materials in which the material is subjected to gaseous attenuating blasts to be drawn out into fibers, including, in combination, a support, a hollow rotor having a perforated wall journaled for rotation on the support, means for rotating the rotor, means for delivering heat-softened mineral material into the rotor and into contact with the perforated wall whereby centrifugal forces of rotation project the material through the perforations in the wall to form outwardly moving discrete bodies, a first combustion burner having an annularly-shaped combustion chamber disposed concentric with the rotor and of a diameter greater than that of the perforated wall thereof, an annular manifold surrounding the combustion chamber wherein the inner wall of the manifold forms the outer wall of the combustion chamber, said wall having a plurality of circumferentially-spaced channels formed therein for conveying combustible mixture from the manifold into the combustion chamber, the mixture being adapted to be burned within the combustion chamber, the walls of the combustion chamber being shaped to provide an annular restricted region concentric with and spaced from the outer wall of the combustion chamber to influence the gases in the chamber to move in paths to promote complete combustion of the gases, the lower wall of said burner having an annular orifice means arranged to direct hot gases of combustion downwardly into engagement with the outwardly moving discrete bodies to attenuate the bodies to fibers, a second annularly-shaped burner disposed exteriorly of the rotor and adapted to burn a combustible mixture, said second burner having orifice means through which the gases are discharged as a second gaseous blast of lesser velocity, the orifice means of the second burner being arranged to direct the gases of the second blast toward the rotating surface whereby bodies penetrating the attenuating blast are redirected by the second blast into the attenuating blast and means for restricting induced air set up by the high velocity blast.

4. A method of producing fibers from heat-softenable fiber-forming material including the steps of delivering a stream of the material onto a rapidly rotating surface for centrifuging the material into a plurality of outwardly moving elongated bodies, burning a combustible mixture in an annularly shaped confined zone, continuously introducing combustible mixture from an annular manifold surrounding the annular confined zone through circumferentially spaced passages opening into the periphery of the confined zone, flowing the burning gases generally radially toward the axis of the rotating surface in the confined zone and through an annular restricted region in said zone to promote complete combustion of the gases, abruptly changing the direction of flow of the burning gases, discharging the intensely hot gases of combustion at high velocities downwardly through an annular restricted orifice concentric with the axis of the rotating surface, and engaging the discharged gases with the bodies to attenuate them to fibers.

5. A method of producing fibers from heat-softenable fiber-forming material including the steps of delivering a stream of the material onto a rapidly rotating surface for centrifuging the material into a plurality of outwardly moving elongated bodies, burning a combustible mixture in an annularly shaped confined zone, continuously introducing combustible mixture from an annular manifold surrounding the annular confined zone through circumferentially spaced passages arranged to direct the incoming mixture in diverging angular directions to impinge the gases in direct contact with the heated surfaces at the mixture entrance region of the confined zone, flowing the burning gases generally radially toward the axis of the rotating surface in the confined zone and through an annular restricted region in said zone, abruptly changing the direction of flow of the burning gases and discharging the intensely hot gases of combustion downwardly at high velocities through an annular restricted orifice concentric with the axis of the rotating surface, and engaging the discharged gases with the bodies to attenuate them to fibers.

6. Apparatus for producing fibers from heat-softened mineral material including a support, a member journaled for rotation on the support, means for rotating the member, means for delivering a stream of heat-softened material into contact with the rotating member whereby centrifugal forces of rotation project the material outwardly of the axis of rotation, said member being formed to shape the outwardly moving material into a plurality of primary filaments, an annularly-shaped burner having an annularly-shaped combustion chamber, an annular manifold surrounding the combustion chamber, the circular wall between the combustion chamber and the manifold having a plurality of channels formed therein, said channels being arranged to convey the combustible mixture into the combustion chamber whereby the incoming mixture is arranged to be burned in the chamber and the burned gases moved generally radially toward the axis of the rotating member, the upper and lower walls defining the combustion chamber being shaped to provide an annular restricted region spaced from the circular wall of the chamber to influence the gases to move in circuitous paths during combustion to promote complete combustion, and a restricted annular orifice formed in a lower wall of the combustion chamber and adjacent the periphery of the rotating member through which the intensely hot gases of combustion are discharged downwardly as a high velocity blast into engagement with the primary filaments for attenuating the primary filaments to fine fibers.

7. The method of producing fibers from heat-softenable fiber-forming material including the steps of delivering a stream of material into engagement with a rapidly rotating perforated surface and thereby distributing the material outwardly by centrifugal forces in a plurality of primary filaments, burning a combustible mixture in a first annularly-shaped combustion zone, continuously introducing combustible mixture into the combustion chamber from an annular manifold surrounding the annular chamber through circumferentially-spaced passages, flowing the burning gases generally radially in the combustion chamber toward the axis of the rotating surface and through an annular restricted region in the chamber spaced from the mixture entrance region of the chamber, abruptly changing the direction of flow of the burning gases, discharging the intensely hot gases of combustion downwardly through an annular restricted orifice concentric with the axis of the rotating surface into engagement with the primary filaments for attenuating the filaments to fibers, directing a second gaseous blast of hot products of combustion from a second combustion chamber radially toward the rotating surface for augmenting the heat in the region of the primary filaments, and restricting the induced air set up by the attenuating blast discharged from the first annular combustion chamber.

8. Apparatus for producing fibers from heat-softened mineral material including a support, a member journaled for rotation on the support, means for rotating the member, means for delivering a stream of heat-softened material onto the rotating member whereby centrifugal forces of rotation project the material outwardly of the axis of rotation, said member being provided with orifices to shape the outwardly moving material into a plurality of primary filaments, a first annularly-shaped burner having an annular combustion chamber, an annular manifold surrounding the chamber whereby the inner wall of the manifold provides the outer wall of the combustion chamber, circumferentially spaced passage means in said wall for conveying combustible mixture from the manifold into the combustion chamber in which the mixture is adapted to be burned, the upper and lower walls defining the first combustion chamber having adjacent raised portions providing an annular restricted region to influence the gases to move in circuitous paths to promote complete combustion, the lower wall of the combustion chamber adjacent the rotating member having an annular passage concentric with the rotating member through which gases of combustion from the combustion chamber are discharged into engagement with the filaments to attenuate the filaments to fibers, a second annularly-shaped burner disposed concentric with said first annularly-shaped burner and arranged to burn a combustible mixture therein, and a wall of the second burner being formed with an annular orifice arranged to direct gases of combustion from the second burner toward and into contact with the gases delivered from the combustion chamber of the first burner.

References Cited by the Examiner

UNITED STATES PATENTS

| | | | |
|---|---|---|---|
| 2,222,822 | 11/1940 | Nordensson | 158—99 |
| 2,260,166 | 10/1941 | Cope | 158—99 |
| 2,464,333 | 3/1949 | McGlaughlin | 158—99 |
| 2,489,244 | 11/1949 | Stalego | 65—7 |
| 2,561,200 | 7/1951 | Hess | 158—116 |
| 2,596,341 | 5/1952 | McCreery et al. | 158—99 |
| 2,609,566 | 9/1952 | Slayter et al. | 65—6 |
| 2,624,912 | 1/1953 | Heymes et al. | 65—6 |
| 2,707,847 | 5/1955 | Anliker | 65—11 |
| 2,931,422 | 4/1960 | Long | 65—3 |
| 3,012,281 | 12/1961 | Stalego | 65—6 |

DONALL H. SYLVESTER, *Primary Examiner.*

MICHAEL V. BRINDISI, *Examiner.*